United States Patent [19]

Lorenzen et al.

[11] 4,250,690
[45] Feb. 17, 1981

[54] CONTAINER LOADING SYSTEMS

[75] Inventors: Peder Lorenzen, Risskov; Jacob A. Nielsen, Viby J.; Ole Prydtz, Egaa, all of Denmark

[73] Assignee: Kosan Crisplant A/S, Denmark

[21] Appl. No.: 974,488

[22] Filed: Dec. 29, 1978

[30] Foreign Application Priority Data

Dec. 29, 1977 [GB] United Kingdom ............... 54097/77

[51] Int. Cl.³ ............................................. B65B 5/10
[52] U.S. Cl. ...................................... 53/475; 53/503; 53/536; 53/245; 414/80
[58] Field of Search ................. 53/536, 245, 503, 236, 53/475; 414/80, 84

[56] References Cited

U.S. PATENT DOCUMENTS

| | | | |
|---|---|---|---|
| 3,024,585 | 3/1962 | Schubert et al. | 53/236 |
| 3,864,893 | 2/1975 | Murao | 53/536 X |

*Primary Examiner*—Travis S. McGehee
*Attorney, Agent, or Firm*—Craig & Antonelli

[57] ABSTRACT

A method and apparatus for loading containers with articles, such as post parcels, includes the use of a carrier device which is lowered into a container by suitable hoisting means at a rate dependent upon the number of articles deposited on the carrier device. The carrier device is positioned within the upper portion of a container in which articles are to be stored, and a conveyor belt delivers articles onto a pivotal flap member of the carrier device. Once the articles reach a certain height on the flap member, photocells signal the hoisting means to lower the carrier device further into the container, and this process continues until the carrier device is near the bottom of the container. Once the carrier device reaches its lowermost position, the pivotal flap member swings downwardly to release the accumulated articles into the container. The carrier device is then withdrawn from the filled container, and the container may then be removed. Through the use of this carrier device to fill a container, articles delivered by the conveyor belt fall only a short distance during the filling of the container, thus preventing damage to the delivered articles.

10 Claims, 5 Drawing Figures

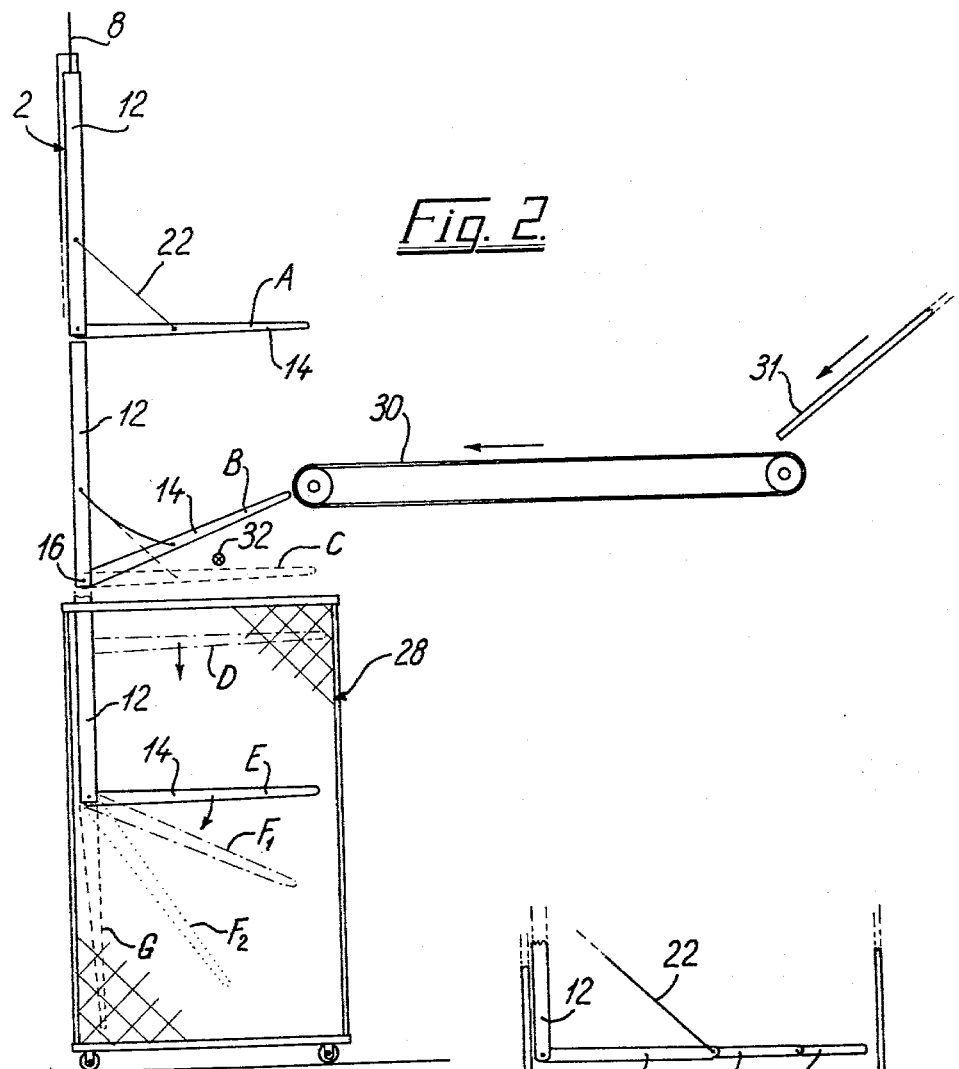
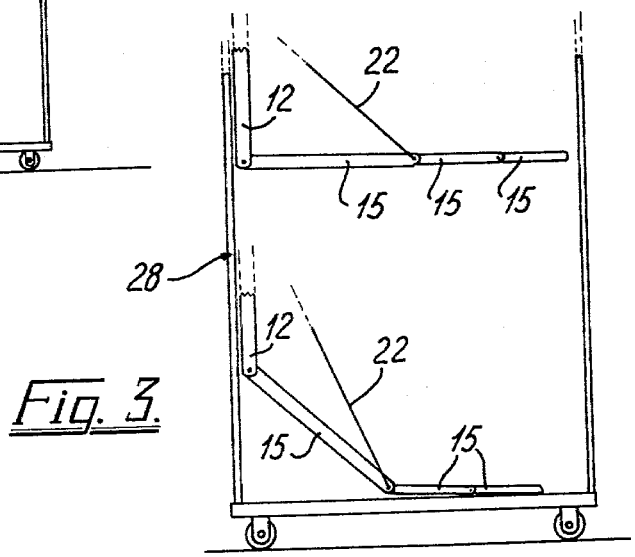

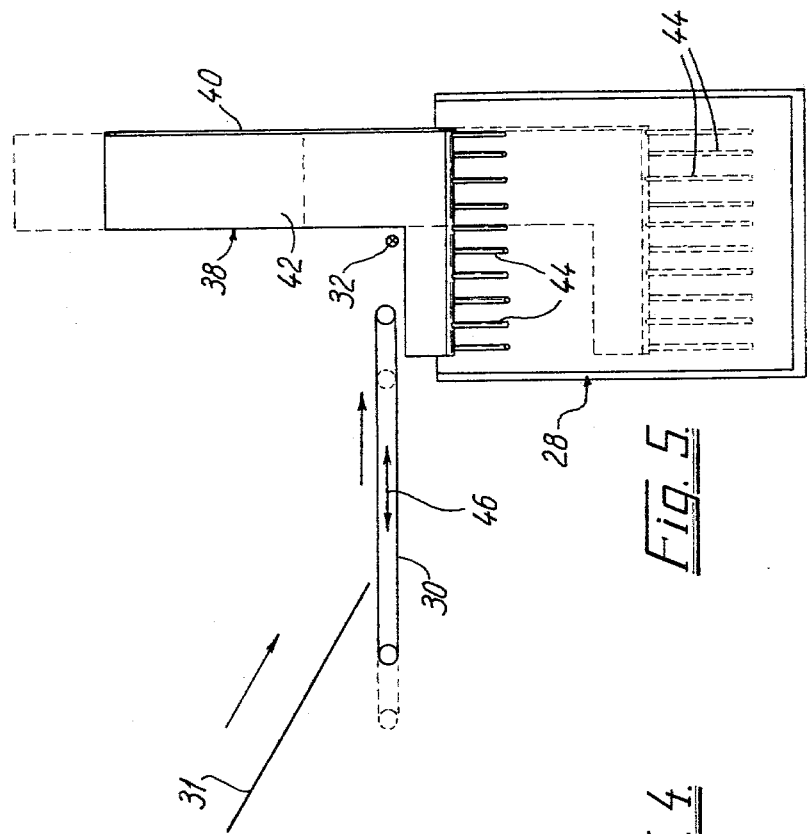
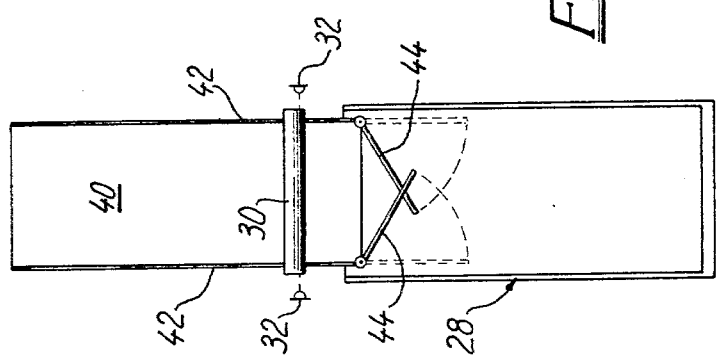

CONTAINER LOADING SYSTEMS

The present invention relates to materials handling and more particularly to methods and means for filling articles such as post parcels into an open container.

There are many types of articles such as post parcels, which are not really fragile, but nevertheless should be handled with a certain care, as for example when they are thrown into a bag. It is customary practice to fill post parcels into postal bags or sacks, and it is here permissible to drop the articles into the sack, because the sack is not very high, and because it is yieldable so as to some degree absorb the impact when a parcel hits the sack or even other parcels in the sack. The articles may be dropped into the sack manually or automatically as they are unloaded e.g. from an automatic parcel sorter device operating to sort out the parcels to a plurality of sacks each corresponding to a certain destination.

It is aforeseen that the development will lead towards the use of stiff pallet containers in lieu of sacks, and it will be desirable that these containers be higher and more voluminous than the standard sacks. The increased height and rigidity of the containers will make it more difficult to load them with parcels in a gentle manner, if the parcels are just dropped down into the containers from above the top end thereof. In some services there is a prescribed maximum of 80 cm for the free fall of a parcel, but of course it would be attractive to reduce this height further. The loading problems are most pronounced in connection with automatic supply of parcels to the container, as by manual filling there is at least the possibility of putting the parcel into the container in a gentle manner. However, the containers are liable to be used primarily for automatic filling, at places where the parcels will normally be delivered from the outlet end of an overhead chute or conveyor.

In order to effect automatic filling of the container in a gentle manner it would be possible to somehow arrange for an open side of the container, through which the chute or conveyor could be introduced into the container first near the bottom thereof and then in gradually higher levels, e.g. by lowering the entire container as it is being filled, the said open side being held closed by suitable means underneath the chute or conveyor until it is closable by a container side element when the container is full. This and similar solutions, however, requires the container to be constructed as a sophisticated unit which will inevitably be expensive compared with a simple rigid sided container, and since the containers should be used in large numbers the said type of solution would not appear attractive.

It is the purpose of the invention to provide for methods and means enabling a simple container to be loaded with small falling height for the parcels and with the container assuming a constant position during the filling thereof, whereby no special container movement equipment will be required, as the container may simply stand on the floor underneath the delivery end of the feeding conveyor or chute.

According to the invention use is made of an intermediate parcel carrier member which receives the parcels from the delivery end of the feeding conveyor or chute, initially with the carrier member located only slightly below the said delivery end, whereafter the carrier member is gradually lowered into the container such that the top side of the amount of parcels deposited thereon will steadily be located underneath the delivery end with small spacing therefrom; when the carrier member reaches a predetermined low position in the container it is caused to be retracted, e.g. by being folded together or swung downwardly, so as to release the parcels, whereby these will slide or fall down to the bottom of the container and the carrier member may then be lifted off from the container along the inside thereof without interfering substantially with the parcels now resting in the container. Even if the parcels fall down when they are released, the falling height will be small because the release can take place in a carrier member position reasonably close to the bottom of the container. Thus, even a high container can be loaded with parcels from an overhead dumping point without any of the parcels carrying out any considerable free fall, and the containers themselves need no special adaption whatsoever. They can be placed on the floor underneath the parcel feeding conveyor end, and neither the container support nor the feeding conveyor need to be vertically movable.

The scope of the invention is defined in more detail in the appended claims, and in the following the invention is described in more detail, by way of examples, with reference to the accompanying drawings, in which:

FIG. 2 is a side view thereof, illustrating various positions of the parcel carrier member, FIG. 3 is a side view illustrating a modification of the carrier member, FIG. 4 is a schematic side view of another embodiment of the invention, and FIG. 5 is an end view of the embodiment of FIG. 4.

Figure 1:
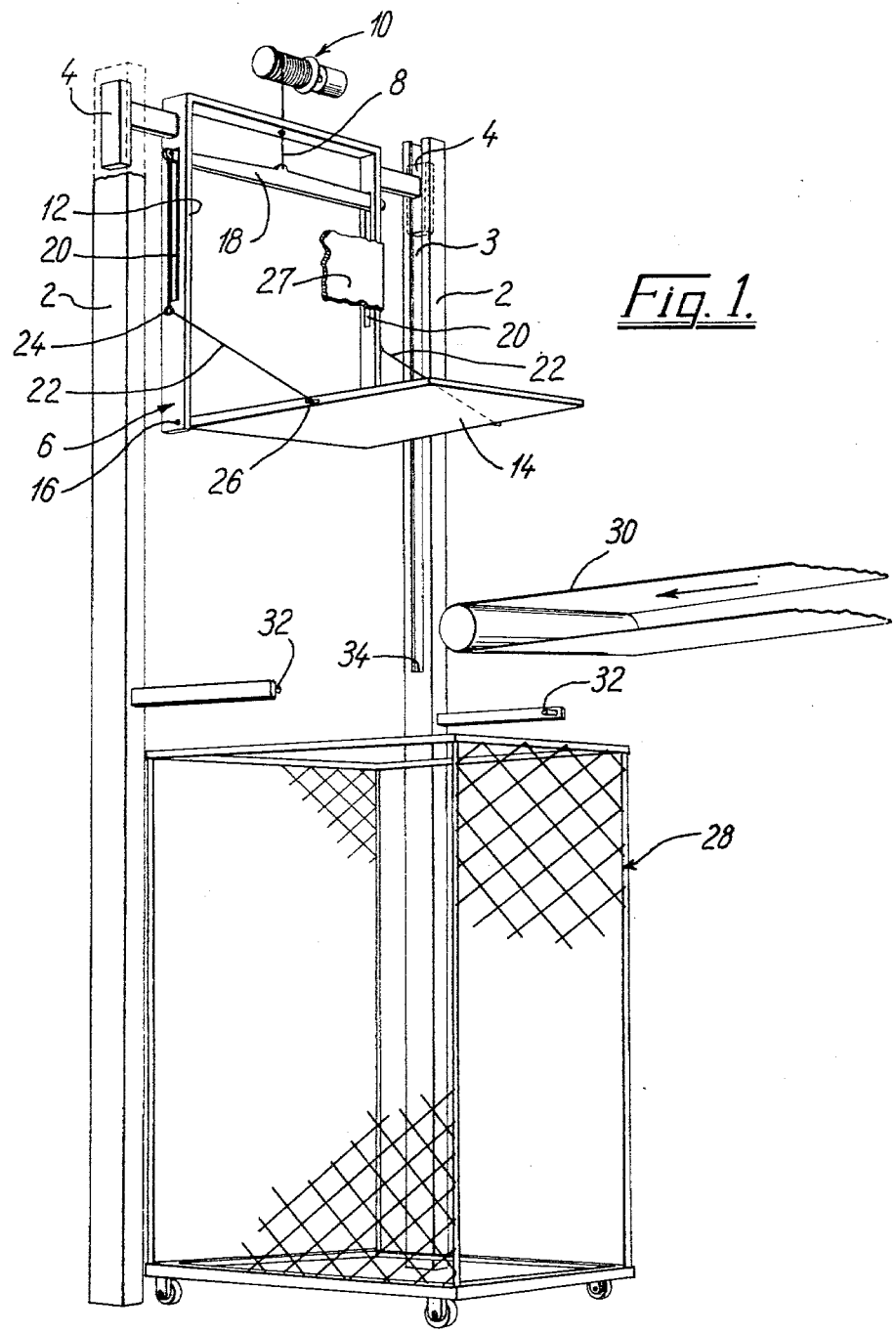
FIG. 1 is a perspective view of an apparatus according to the invention.

The apparatus shown in FIGS. 1 and 2 comprises a pair of opposed guiding posts 2 having tracks 3 for vertically guiding a pair of slide shoes 4 mounted adjacent the top of a carrier device 6, such that this device is vertically guidable by the tracks 3 when it is hoisted up and down by means of a hoisting wire 8 and any suitable hoisting means as designated 10. The carrier device 6 comprises an upper frame member 12 which is steadily held in a vertical position by means of the elongate slide shoes 4, and a lowermost flap member 14 hinged at 16 to the lower end of the frame member 12 so as to project, in an initial position as shown topwise in FIGS. 1 and 2, perpendicularly from the frame member. The hoist wire 8 is not connected direct to the frame member 12, but to a yoke 18 which at both ends projects through vertical slots 20 in the side portions of the frame member 12 so as to be vertically movable therein relative to the frame member. The projecting ends of the yoke 18 serve each to hold one end of a wire 22 which extends downwardly through an eye member 24 and further to an attachment point 26 at the corresponding side edge of the flap member 14. In said initial position the frame member 12 will be supported by virtue of the uppermost ends of the slots 20 resting against the top side of the outer ends of the yoke 18, and the length of the wires 22 is so adapted that in this position the flap member 14 projects substantially horizontally from the frame member 12. The front side of the frame member is covered by a cover plate 27.

A container 28 to be loaded with parcels is placed underneath the flap 14 of the raised carrier device 6 so as to be able to receive parcels as supplied by a conveyor belt 30 which in its turn receives the parcels from a chute 31 (FIG. 2) connected e.g. with an unloading station of a sorter conveyor (not shown).

Upon placing the container 28 underneath the flap 14 the carrier device 6 is hoisted downwardly, whereby the flap 14 may snap over the outer end of the conveyor 30 as shown at position B in FIG. 2. Thereafter the flap 14 again assumes its horizontal position, C, and the carrier device is lowered enough to introduce the lower end of the frame member 12 and the entire flap 14 into the upper end of the container, e.g. into the position D of the flap 14. Now the hoisting mechanism 10 is caused to stop lowering of the carrier device, and the conveyor 30 is started so as to unload parcels onto the flap 14 with small falling height. A photocell system 32 is arranged so as to detect the steady presence of parcels in a level just above the top of the container 28 and so as to cause the hoisting mechanism 10 to further lower the carrier device and therewith the flap 14 and the parcels already deposited thereon in response to such detection, until the top of the parcel heap on the flap 14 is again located just underneath the detector system. Hereby the top of the parcels will remain at a substantially constant level, while the height of the parcel heap grows as the carrier device is gradually lowered. The said "steady presence" refers to the fact that the photo sensing system operates with such a time constant that it does not respond to a parcel merely falling through the light beam.

When by its gradual lowering the flap 14 reaches an intermediate position E the carrier device is unable to be further lowered, because the sliding shoe arrangement 4 meets a lower stop represented by the lower end portion 34 of the slots 3. Now the frame member 12 cannot be further lowered, but the photocell system 32, still causes the hoist mechanism 10 to lower the hoisting wire 8 in response to a stationaly build up of parcels at the level of the photocell system. The parcels rest on the flap 14, and when the hoisting wire 8 is allowed to be further lowered this will now result in the weight of the parcels causing the flap 14 to swing downwardly about the hinges 16 and correspondingly the yoke 18 to slide downwardly in the slots 20, the pull being transferred through the wires 22.

By this swinging of the flap 14, represented by positions $F_1$ and $F_2$ in FIG. 2, the entire parcel heap on the flap will be lowered correspondingly in accordance with the supply of new parcels to the top of the heap, and the parcels will gradually be allowed to fill out the container 28, always in a very gentle manner, until the flap 14 assimes the position G practically flat against the container end wall underneath the frame member 12. The said lowermost position of the frame member 12 is located at such a level that there is still room for the flap 14 to be swung down to the bottom of the standard container as illustrated by position G. This position corresponds to a lowermost position of the yoke 18 relative to the frame member 12, and sensor means (not shown) are arranged to detect this position and to thereafter cause the hoisting mechanism 10 to pull the wire 8 upwardly.

It will be appreciated that the vertical frame member 12 and the vertical flap member 14, position G, are very easy to pull upwardly from the container, the hoisting force now being applied through the yoke 18 to the attachment points 26. The arrangement may even be such that in position G of the flap member the wires 22 will be located behind the hinge points 16, whereby the hoisting pull will tend to maintain the flap 14 aligned with the vertical frame member 12, assisted by suitable pivot limitation means (not shown).

Thus, when the flap 14 has reached its lower position G the carrier device is lifted off from the container 28. The conveyor 30 is caused to stop, and the container may be replaced by a new container, manually or by automatic replacement means.

When the carrier device 6 reaches its uppermost position the flap 14 is caused to swing outwardly from the position G to position E (or rather A) by any suitable actuator means, e.g. abutment means causing the wires 22 to be displaced from behind the hinge points 16 to a position in front of these points, whereby the weight of the carrier device will cause the same to slide downwardly with respect to the yoke 18 and therewith to cause the flap member 14 to be swung into its horizontal position (A). It will be understood, however, that the detailed manner in which the pivot control of the flap 14 is effected, may be largely modified within the scope of the invention.

In FIG. 3 it is illustrated that the flap member may be composed of several flap elements 15 hinged to each other so as to generally form a rigid support surface for parcels resting thereon, while being upwardly pivotal as shown at the bottom of FIG. 3, such that they may be gradually shifted from their horizontal position into their vertical position by the retraction of the carrier device 6 from the container, whereby the filling of the container may be effected in a very gentle manner, because the parcels may be released from the flap member practically without carrying out any free fall at all.

In FIGS. 4 and 5 is schematically shown an embodiment in which the carrier device is a plate structure 38 comprising a rear wall 40 and two opposed lateral walls 42, each of the latter carrying along their lower edge a pivotal grate member 44 constituting one half of the bottom flap as discussed above. In their raised positions the grate members need not be horizontal, as they may converge downwardly. As shown by a double arrow 46 the parcel feeding conveyor is horizontally reciprocal as a whole, whereby the parcels or other articles to be filled into the container may be evenly distributed on the top of the heap of articles on the carrier flap members 44. It will be appreciated that due to the carrier flap being divided into opposed halves the lowermost release position of the carrier device may be located generally closer to the bottom of the container than when the bottom flap is a unitary member covering the entire container bottom from only one side thereof.

The carrier member 14 may be constituted by means other than pivotal flap members, e.g. a folding structure of a telescopic slide arrangement. Even a canvas or other sheet may be employed when means are provided for releasing it at the side opposite to which it is secured, e.g. in a carrier structure as used in FIGS. 4-5.

We claim:

1. A method of loading an open top container with parcels as supplied from a delivery position above the container for being dumped into the container, characterized in that the consecutive parcels are dumped onto an intermediate carrier member, said intermediate carrier member comprising a flap member rotatably attached to a frame member and hoisting means operably attached to both said frame member and said flap member, gradually lowering said intermediate carrier member into the container such that the parcels are dumped a relatively short distance from the delivery position to the carrier member or the top of the parcels already deposited thereon, arresting the downward movement of said frame member while permitting said hoisting means to continue to lower said flap member, whereby a rotatable movement is affected between said flap member and said frame member so that said carrier member in a lowered position is caused, by tilting or otherwise, to release the parcels and assume a position generally adjacent one or more sides of the container, the carrier member in this position finally being moved up from its engagement with the parcels and the container and returned into its initial parcel carrying position.

2. A method according to claim 1, characterized in that the lowering of the carrier member is controlled by sensor means detecting the presence of the top of the heap of parcels on the carrier member in a level below the delivery position.

3. An apparatus for loading an open top container with parcels as supplied from a delivery position above the container, characterized in that it comprises a carrier device and means for moving the same vertically between a raised starting position above a container as placed therebeneath and a lowered position at least partially received in the container, said carrier device having substantially vertically disposed carrier portions adapted to be located adjacent interior side portions of the container when lowered into the container, said carrier portions having at their lower ends a carrier member operable to be shifted between a generally horizontal parcel carrying position and an inoperative position in which it is located generally retracted from its parcel carrying position, e.g. in vertical alignment with said carrier portions, said hoisting means which is provided for gradually lowering the carrier device being operably connected to both said carrier portions and said carrier member when said carrier device is in its parcel carrying position and being inoperably connected to said carrier portions when said carrier device is in said lowered position, whereby said carrier member may be shifted into said inoperative position in response to further operation of said hoisting means.

4. An apparatus according to claim 3, in which sensor means are provided for controlling the gradual lowering of the carrier device in response to the top of a parcel heap on the carrier member reaching a predetermined level.

5. An apparatus according to claim 3, in which the carrier member is a bottom flap hinged to the lower end of the carrier portions and connected with releasable arresting means for holding it in its said parcel carrying position and allowing it to swing downwardly therefrom, respectively.

6. An apparatus according to claim 5, in which the flap is provided with one or more outermost flap portions hinged so as to be upwardly pivotal in the parcel carrying position without being downwardly pivotal therefrom.

7. An apparatus according to claim 5, in which the carrier member is constituted by two flap portions hinged to the lower ends of respective opposed carrier portions.

8. The method of claim 1, wherein the operable attachment between said hoisting means and said frame member is broken once said downward movement of said frame member is arrested and said flap member begins to rotate.

9. An apparatus for loading an open top container with parcels as supplied from a delivery position above the container or being dumped into the container, characterized in that it comprises a carrier device and means for moving the same vertically between a raised starting position above a container as placed therebeneath and a lowered position at least partially received in the container, said carrier device having substantially vertically disposed carrier portions adapted to be located adjacent interior side portions of the container when lowered into the container, said carrier portions having at their lower ends a carrier member operable to be shifted between a generally horizontal parcel carrying position and an inoperative position in which it is located generally retracted from its parcel carrying position, e.g. in vertical alignment with said carrier portions, means being provided for gradually lowering the carrier device with the carrier member assuming its parcel carrying position and for causing the carrier member to be shifted into said inoperative position in response to the carrier device reaching said lowered position, said carrier member comprising a bottom flap hinged to the lower end of the carrier portions and connected with releasable arresting means for holding it in its said parcel carrying position and allowing it to swing downwardly therefrom respectively, said apparatus further including guiding means which are provided for guiding the carrier device for vertical parallel displacement, the carrier device being suspended in a hoisting wire by means of a yoke which is vertically movable relative to said carrier portions between an uppermost position, in which the yoke carries the carrier device and serves to hold the said bottom flap, via a control connection therebetween, in its horizontal carrier position, and a lower position in which the yoke through said control connection enables the flap to swing downwardly into a temporarily locked, substantially vertical position, said guiding means comprising lower stop means for defining the said lower position of the carrier device such that by continued lowering of the yoke the bottom flap is allowed to swing downwardly.

10. An apparatus for loading an open top container with parcels as supplied from a delivery position above the container for being dumped into the container, characterized in that the consecutive parcels are dumped onto a carrier device which is gradually lowered into the container and in that guiding means are provided for guiding the carrier device for vertical parallel displacement, the carrier device being suspended in a hoisting wire by means of a yoke which is vertically movable relative to carrier portions of said carrier device between an upper most position, in which the yoke carries the carrier device and serves to hold a bottom flap of said carrier device, via a control connection therebetween, in a horizontal carrier position, and a lower position in which the yoke through said control connection enables said flap to swing downwardly into a temporarily locked, substantially vertical position, said guiding means comprising lower stop means for defining the said lower position of the carrier device such that by continued lowering of the yoke, the bottom flap is allowed to swing downwardly.

* * * * *